United States Patent [19]
Hoshino

[11] Patent Number: 5,335,575
[45] Date of Patent: Aug. 9, 1994

[54] CONGA STAND

[75] Inventor: Yoshiki Hoshino, Aichi, Japan

[73] Assignee: Roland Meinl Company, Neustadt/Aisch, Fed. Rep. of Germany

[21] Appl. No.: 51,197

[22] Filed: Apr. 22, 1993

[30] Foreign Application Priority Data

Aug. 24, 1992 [JP] Japan .................. 4-248787

[51] Int. Cl.$^5$ .................. G10D 13/02
[52] U.S. Cl. .................. 84/421; 248/436
[58] Field of Search .................. 84/421; 248/435, 436

[56] References Cited

U.S. PATENT DOCUMENTS

| | | | |
|---|---|---|---|
| 664,678 | 12/1900 | Quinn | 84/421 |
| 1,008,545 | 11/1911 | Humphrey | 84/421 |
| 1,227,850 | 5/1917 | Stone | 248/436 |

FOREIGN PATENT DOCUMENTS 4006484 9/1991 Fed. Rep. of Germany.

Primary Examiner—M. L. Gellner
Assistant Examiner—Patrick J. Stanzione
Attorney, Agent, or Firm—Browdy and Neimark

[57] ABSTRACT

An easily foldable conga stand (S) that takes little space and facilitates the setup of a conga (100). The conga stand (S) comprises three leg members (10) each having on its upper end a presser portion (12) and on its lower end a leg lower hinge portion (15), leg slide members (20) each attached to each leg member (10) and provided with a hinge portion (25), a shank member (30) having a lower hinge portion (35) on its lower end, a shank upper slide member (40) attached to the shank member (30) and provided with a hinge portion (45), a shank lower slide member (50) attached to the shank member (30) and provided with a hinge portion (55), three holding stays (60) both ends of each being pivoted to the hinge portion (25) of the leg slide member (20) and the hinge portion (45) of the shank upper slide member (40), respectively, three support stays (70) both ends of each being pivoted to the leg lower hinge portion (15) and the hinge portion (55) of the shank lower slide member (50), respectively, and three auxiliary stays (80) both ends of each being pivoted to the lower hinge portion (35) of the shank member (30) and the middle of the support stay (70), respectively.

1 Claim, 9 Drawing Sheets

CONGA STAND

BACKGROUND OF THE INVENTION

This invention relates to a foldable conga stand.

Figure 9:
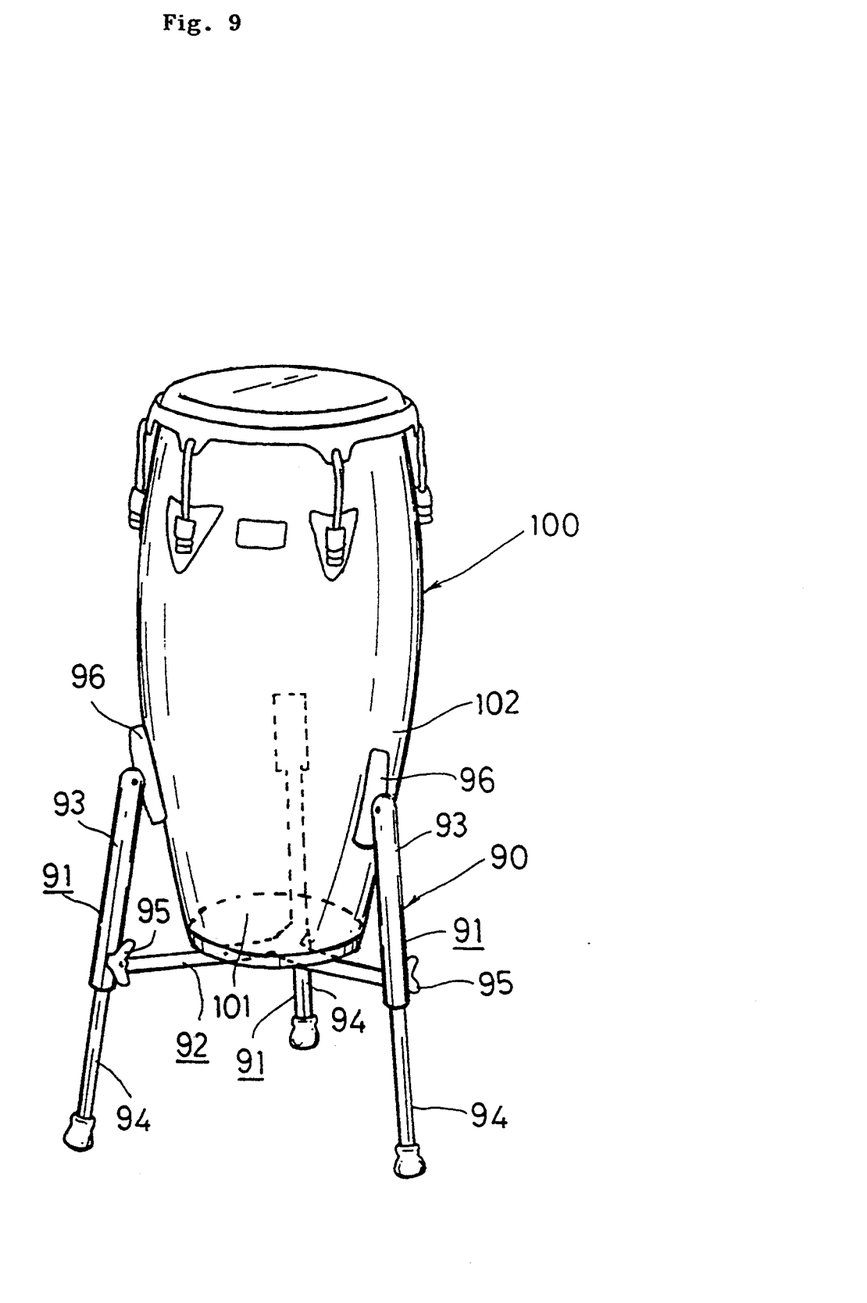
FIG. 9 is a perspective view of a related-art conga stand.

A known conga stand is shown in FIG. 9, in which 90 denotes a stand and 100 denotes a conga.

The stand 90 comprises three legs 91 and three spreaders 92 for positioning the respective legs 91 at respective vertexes of an almost equilateral triangle viewed in plane.

Each of the legs 91 comprises large-diameter and small-diameter pipes 93 and 94. A presser pad 96 for pressing against and supporting the drum 102 of the conga 100 is formed on the upper end of the large-diameter pipe 93. The small-diameter pipe 94 can be slid through the large-diameter pipe 93, because it has a smaller diameter than the pipe 93.

The spreaders 92 form a Y-shaped support, and are fixedly connected to the large-diameter pipes 93 at respective ends thereof.

The height of the stand 90 can be adjusted by altering the length of the small-diameter pipes 94 projecting from the large-diameter pipes 93. The small-diameter pipes 94 are optionally slid from the large-diameter pipes 93 to determine its desired projecting length, and the small-diameter and large-diameter pipes 94 and 93 are fixed together via bolts 95.

In the stand 90, however, the angle of the spreaders 92 relative to the large-diameter pipes 93 is solidly fixed. Thus, the entire structure of the stand 90 is bulky for transport, even if the length of the legs 91 is adjusted to minimum.

Each time the conga 100 is set up, each length of the legs 91 needs to be adjusted, thereby making intricate the assembly of conga 100.

SUMMARY OF THE INVENTION

Wherefore, an object of this invention is to provide a foldable conga stand that takes little space and facilitates the setup of a conga.

To attain this or other object, the present invention provides a conga stand comprising:

three leg members positioned at each vertex of an almost equilateral triangle viewed in plane, each leg member having on its upper end a presser portion to be pressed against a conga drum and on its lower end a leg lower hinge portion;

three leg slide members attached along the respective leg members, each leg slide member being provided with a hinge portion and being lockable by a locking means;

a shank member positioned at almost the center among the three leg members and having a lower hinge portion on a lower end thereof;

a shank upper slide member attached along the shank member, provided with three hinge portions corresponding to the respective hinge portions of the leg slide members, and lockable by a locking means;

a shank lower slide member attached along the shank member, provided with three hinge portions corresponding to the respective leg lower hinge portions, and lockable by a locking means;

three holding stays, both ends of each holding stay being pivotably attached to the hinge portion of the leg slide member and to the hinge portion of the shank upper slide member, respectively;

three support stays, both ends of each support stay being pivotably attached to the leg lower hinge portion and to the hinge portion of the shank lower slide member, respectively; and three auxiliary stays, both ends of each auxiliary stay being pivotably attached to the middle portion of the support stay and the lower hinge portion of the shank member, respectively.

BRIEF DESCRIPTION OF THE DRAWINGS

The invention will now be described, by way of example, with reference to the accompanying drawings, in which.

DETAILED DESCRIPTION OF THE PREFERRED EMBODIMENTS

Figure 1:
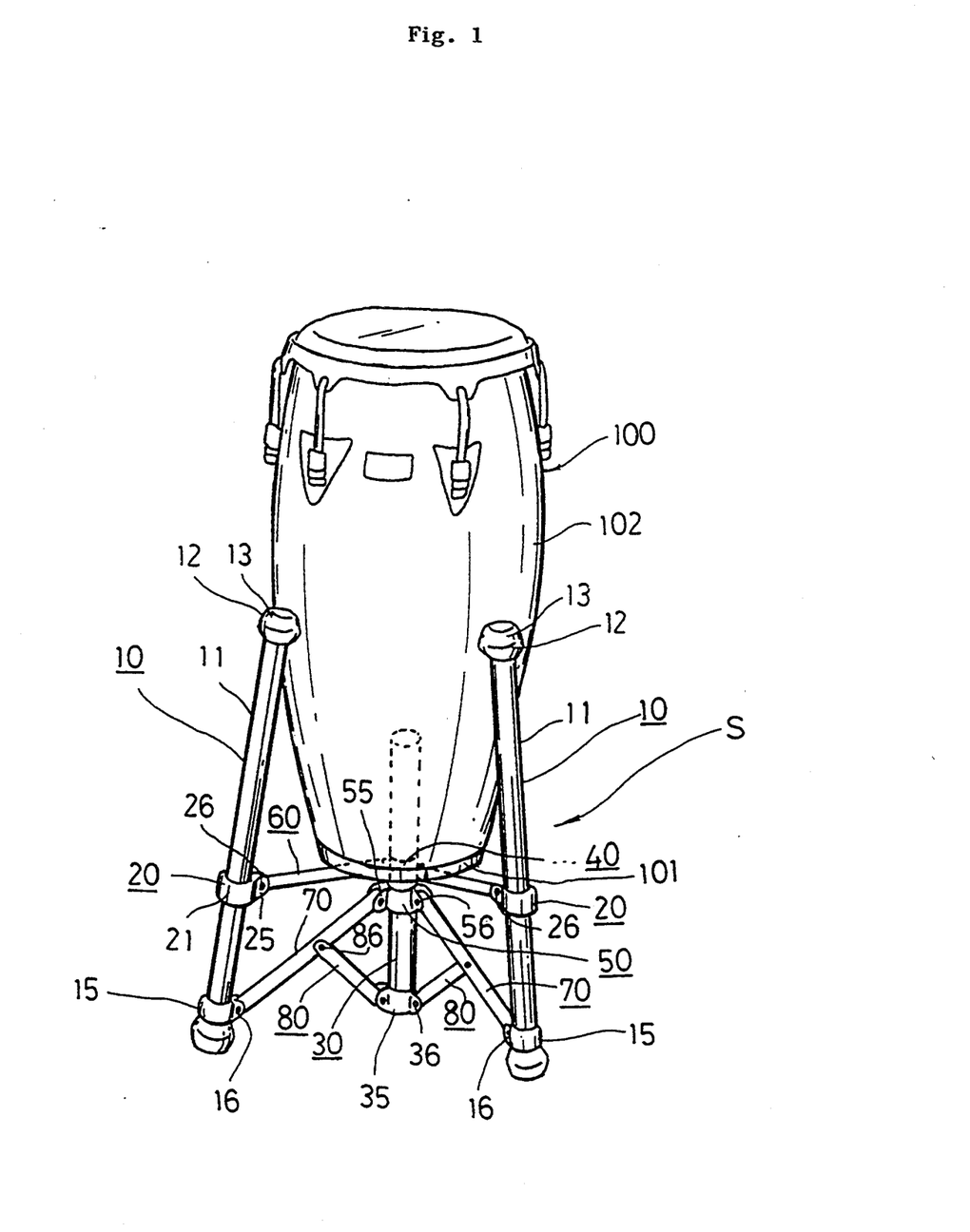
FIG. 1 is a perspective view of a conga stand in use embodying the present invention.
Figure 2:
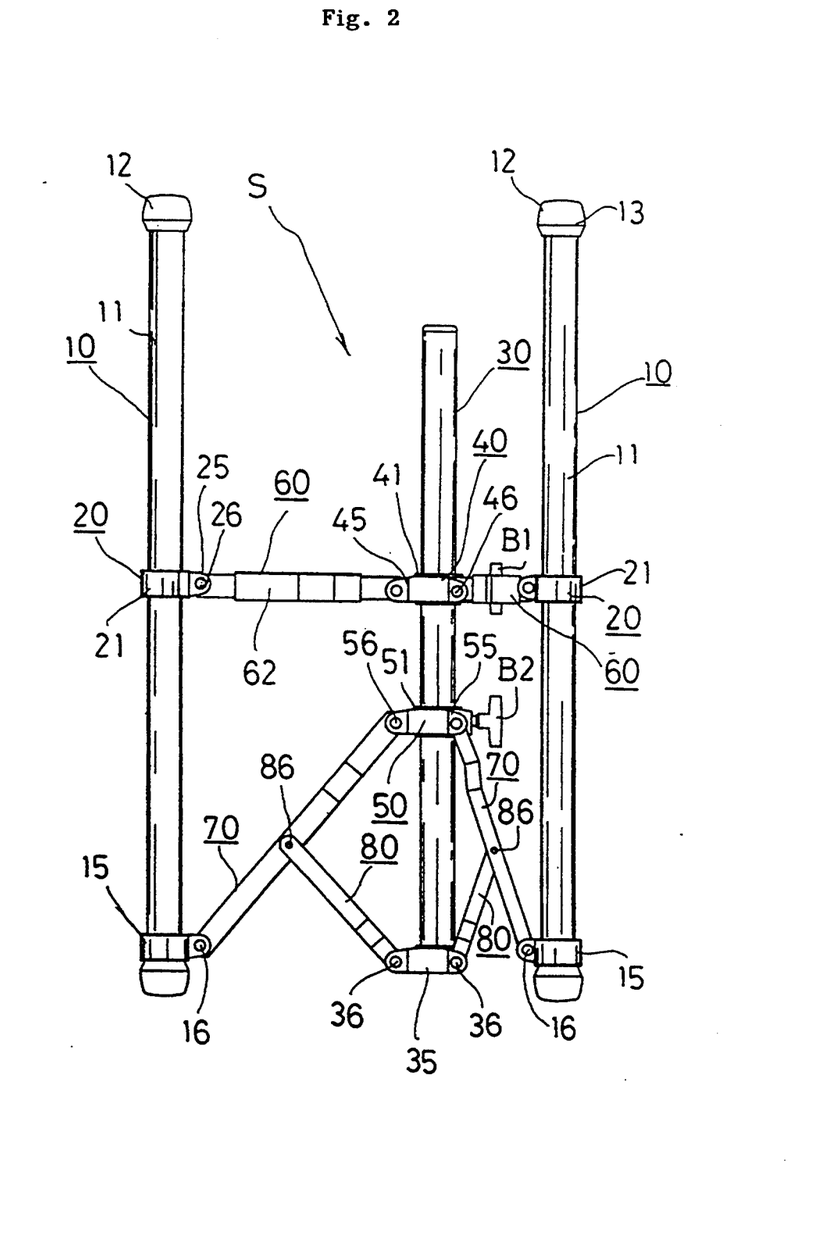
FIG. 2 is a front view of the conga stand which is set up for use.
Figure 3:
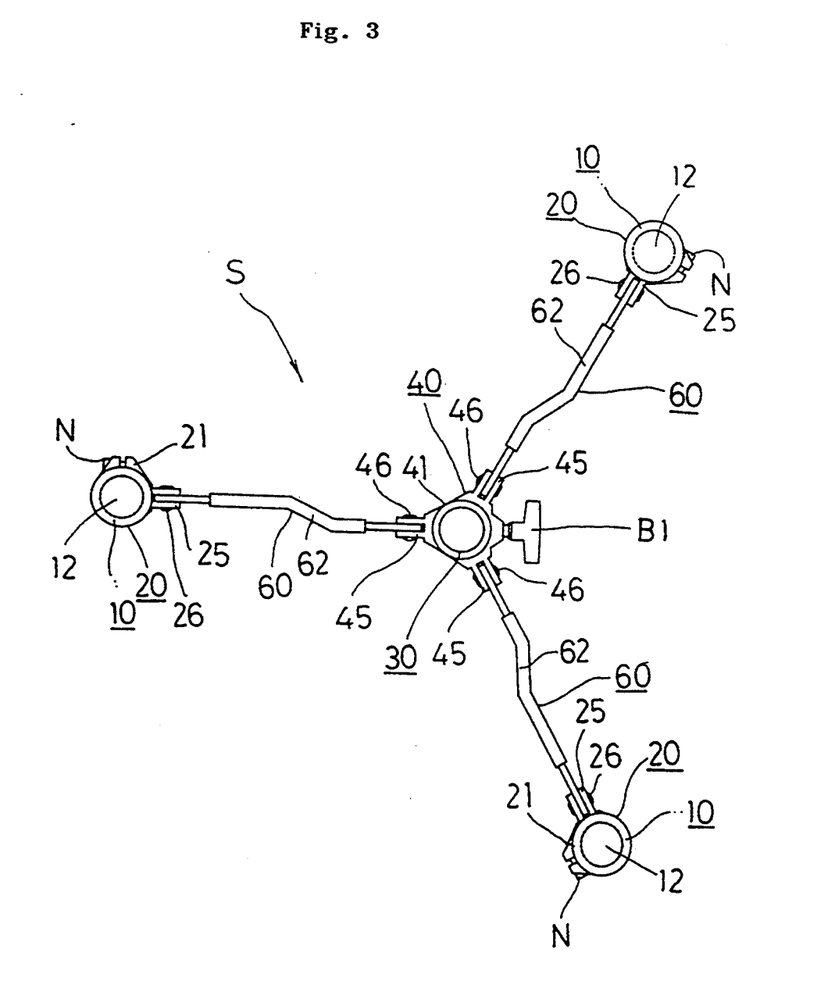
FIG. 3 is a plan view of the stand shown in FIG. 2.

As shown in FIGS. 1, 2 and 3, a conga stand S of the present invention comprises three legs 10 each having a leg slide member 20, a shank 30, a shank upper slide member 40, a shank lower slide member 50, three holding stays 60, three support stays 70 and three auxiliary stays 80.

To avoid figurative confusion, only two of the legs 10 arranged in front of the conga 100 are shown and the other one of the legs 10 behind the conga 100 is omitted in FIGS. 1, 2, 4 and 7. It can be understood apparently from FIG. 3 that the conga stand S is composed of the three legs 10.

Each of the legs 10 is composed of a leg pipe 11. A presser piece 12 for contacting the drum 102 of the conga 100 is formed on the upper end of the leg pipe 11. A leg lower hinge 15 is formed on the lower end of the leg pipe 11. As shown in FIG. 3, the three legs 10 are placed at the respective vertexes of an almost equilateral triangle viewed in plane.

A shock absorber 13 consisting of rubber or other material is attached to the presser piece 12, such that the presser piece 12 closely contacts and securely holds the drum 102 without giving any scratch thereto.

One end of each support stay 70 described later is rotatably attached via a pivot 16 to the leg lower hinge 15 of each leg 10.

Figure 5:
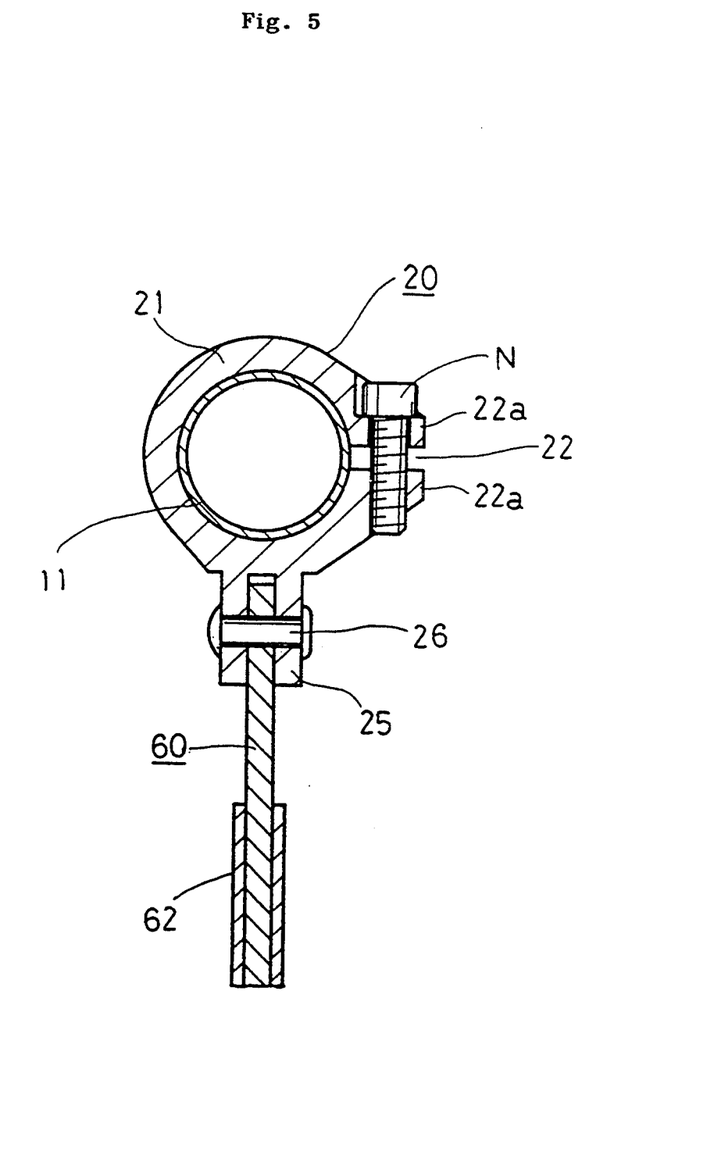
FIG. 5 is a cross-sectional view of a leg slide member provided on the conga stand.

As shown in FIG. 5, each of the leg slide members 20 is composed of a cylindrical body 21. A vertical slot 22 is formed in the periphery of the cylindrical body 21.

Each leg slide member 20 is formed movably along the leg 10, and can be fixed to the desired position by screwing and tightening a screw N into ends 22a defining the slot 22.

A hinge 25 is connected to the outer periphery of the cylindrical body 21 of each leg slide member 20. One end of each holding stay 60 is rotatably attached via a pivot 26 to the hinge 25.

The shank 30 has three lower hinges 35 to each of which one end of each auxiliary stay 80 is rotatably attached via a pivot 36. As shown in FIG. 3, the shank 30 is positioned almost at the center among the three legs 10.

The shank upper and lower slide members 40 and 50 are attached to the shank 30.

The shank upper slide member 40 for adjusting the holding height of the conga 100 is provided around the shank 30 and comprises a vertically movable cylindrical body 41.

Three hinges 45 are formed on the outer periphery of the cylindrical body 41. The cylindrical body 41 can be fixed at the desired position by tightening a bolt B1 in the wall of the cylindrical body 41.

The hinges 45 are provided at positions corresponding to the hinges 25 of the leg slide members 20, respectively. As described above, one end of each holding stay 60 is pivoted to the hinge 25 of the leg slide member 20. The other end of the holding stay 60 is rotatably attached via a pivot 46 to each hinge 45.

The shank lower slide member 50 for adjusting the spread of the conga stand S is formed under the shank upper slide member 40. In the same way as the shank upper slide member 40, the shank lower slide member 50 comprises a cylindrical body 51 movable vertically along the shank 30, and can be fixed to the desired position using a bolt B2. Three hinges 55 are formed on the outer periphery of the cylindrical body 51 corresponding to the leg lower hinges 15, respectively. While one end of each support stay 70 is pivoted to the leg lower hinge 15 of each leg 10, the other end of the support stay 70 is rotatably attached via a pivot 56 to each hinge 55.

Figure 6:
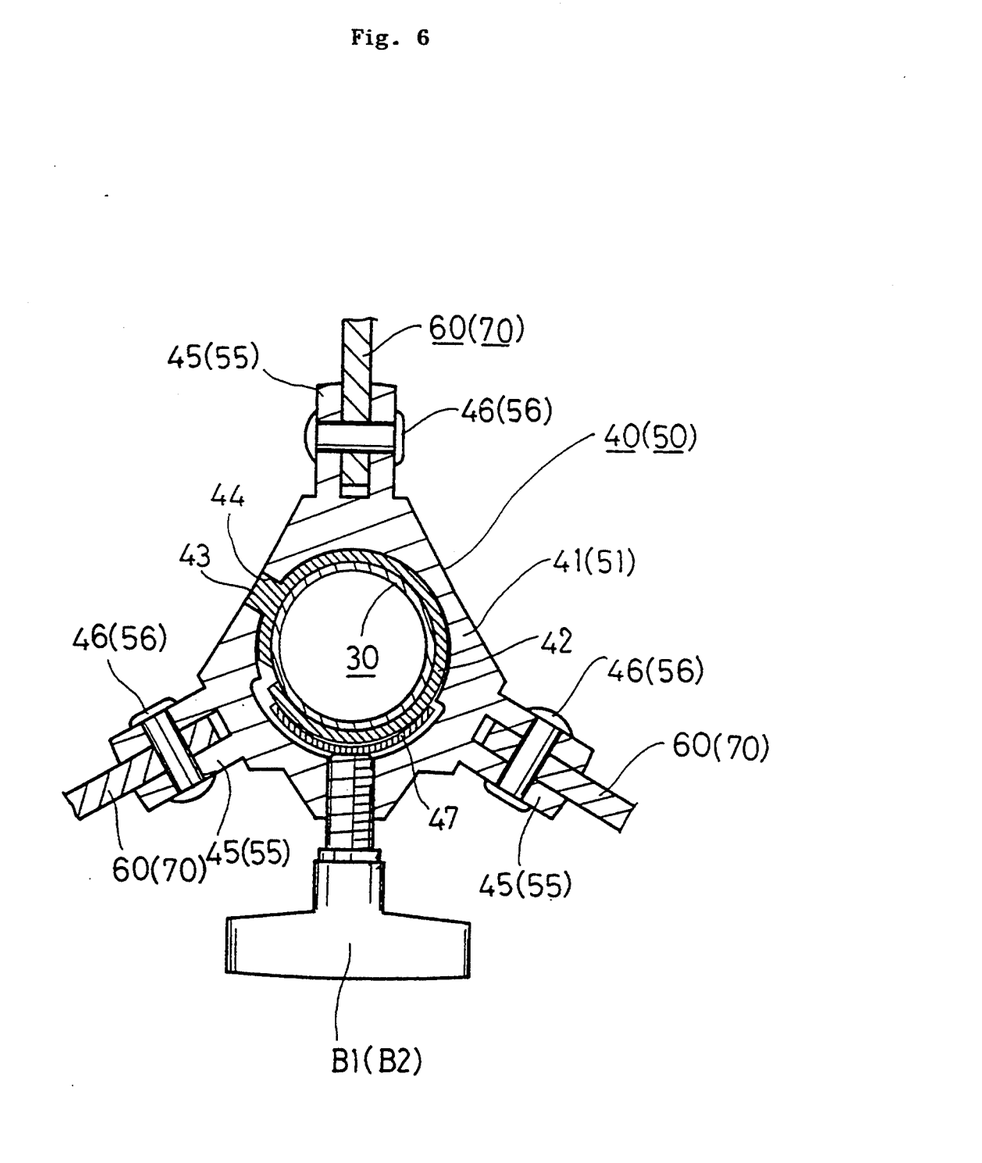
FIG. 6 is a cross-sectional view of a shank upper slide member and a shank lower slide member provided on the conga stand.

As clearly shown in FIG. 6, in the embodiment, bushings 42 consisting of nylon or other material are provided on the inner peripheries of the cylindrical bodies 41 and 51 of the shank upper and lower slide members 40 and 50, respectively, such that the bolts B1 and B2 are tightened without deflecting or scratching the shank 30. Further, presser leaves 47 are inserted between the bushings 42 and the bolts B1, B2, respectively, such that the shank upper and lower slide members 40 and 50 are secured relative to the shank 30. In FIG. 6, 43 denotes a detent for holding the bushing 42 inside the shank upper or lower slide member 40 or 50, and 44 denotes the attachment portion between the detent 43 and the cylindrical body 41 or 51.

As explained in the above, one end of each holding stay 60 is pivoted to the hinge 25 of the leg slide member 20 and the other end thereof is pivoted to each hinge 45 of the shank upper slide member 40. As shown in FIG. 3, such three holding stays 60 form a Y-shaped holder viewed in plane for holding the bottom 101 of the conga 100. Each holding stay 60 is covered with a shock absorber 62 consisting of rubber or other material for absorbing the force of shocks from the bottom 101 of the conga 100.

The three support stays 70 form a forked support. As explained in the above, one end of each support stay 70 is pivoted to the leg lower hinge 15 of the leg 10 and the other end thereof is pivoted to each hinge 55 of the shank lower slide member 50.

The three auxiliary stays 80 also form a forked support. One end of each auxiliary stay 80 is pivoted to each lower hinge 35 of the shank 30 and the other end thereof is rotatably attached via a pivot 86 to almost the middle of each support stay 70, thereby controlling the opening angle of the support stays 70.

When the conga 100 and the conga stand S having the aforementioned structure are set up, as shown in FIGS. 2 and 3, the legs 10 of the conga stand S are first pulled apart from the shank 30, until the legs 10 correspond to the vertexes of an equilateral triangle viewed in plane, respectively. In order to adjust the height of the conga 100, the shank upper slide member 40 is then slid along the shank 30 and fixed by the bolt B1 at the desired position.

Subsequently, the leg slide members 20 are slid along the legs 10 and secured by the screws N at the position where the three holding stays 60 are level. Next, the bottom 101 of the conga 100 is laid on the holding stays 60.

Figure 4:
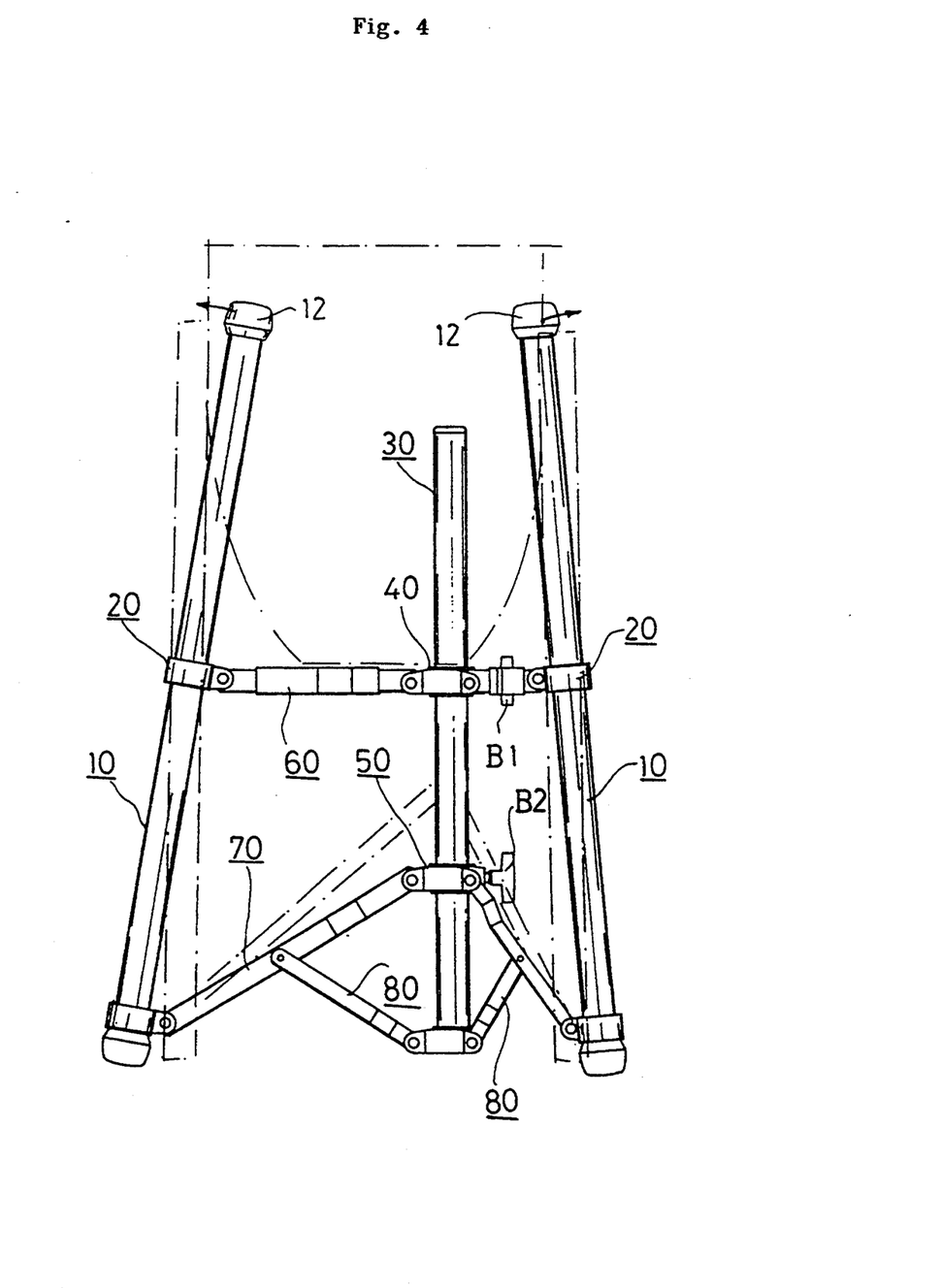
FIG. 4 is another front view of the conga stand which is set up for use.

Subsequently, as shown in FIG. 4, the shank lower slide member 50 is slid downward along the shank 30, thereby tilting the legs 10 until the presser pieces 12 of the legs 10 closely contact the drum 102 of the conga 100. The shank lower slide member 50 is fixed at such position using the bolt B2. Consequently, the conga 100 is set up: the bottom 101 is supported by the holding stays 60 and the drum 102 is securely held among the presser pieces 12.

As shown by broken lines in FIG. 4, when the conga 100 is replaced with another conga different in diameter, the opening angle of the legs 10 can be altered only by adjusting the fixing position of the shank lower slide member 50, without adjusting the position of the holding stays 60. Therefore, the holding height of the conga 100 requires no change.

Figure 7:
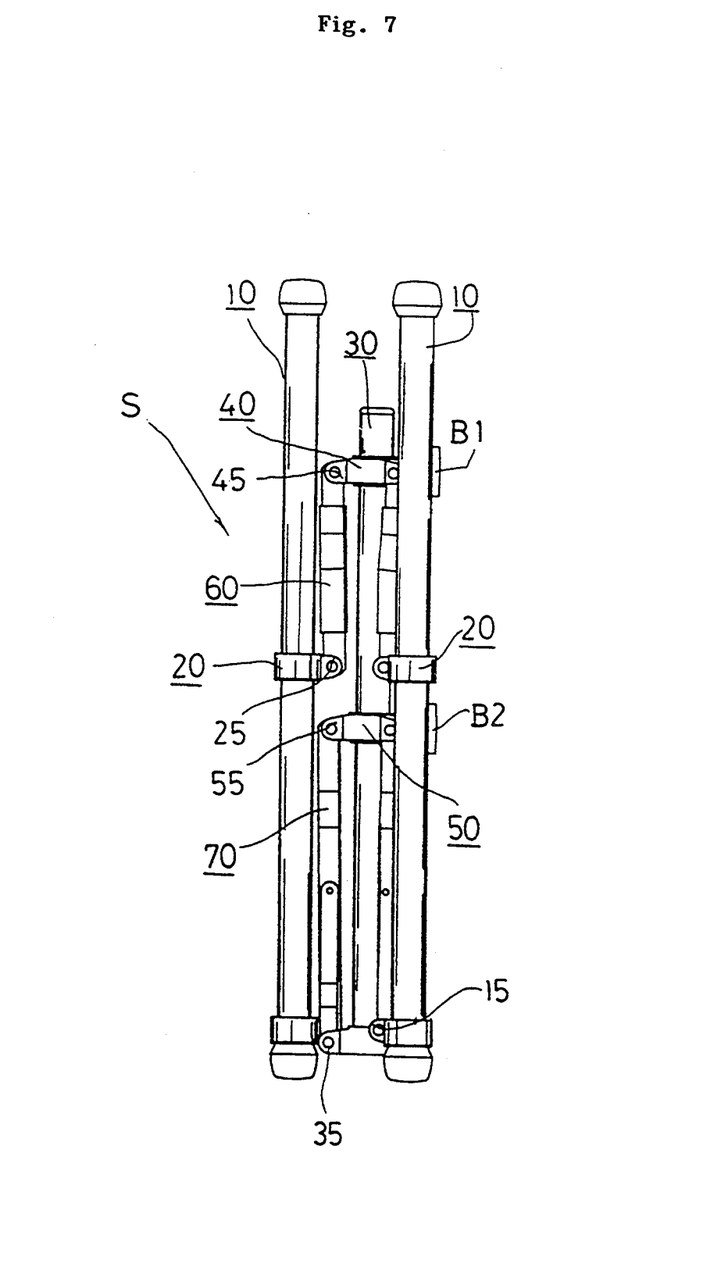
FIG. 7 is a front view of the conga stand in its folded condition.
Figure 8:
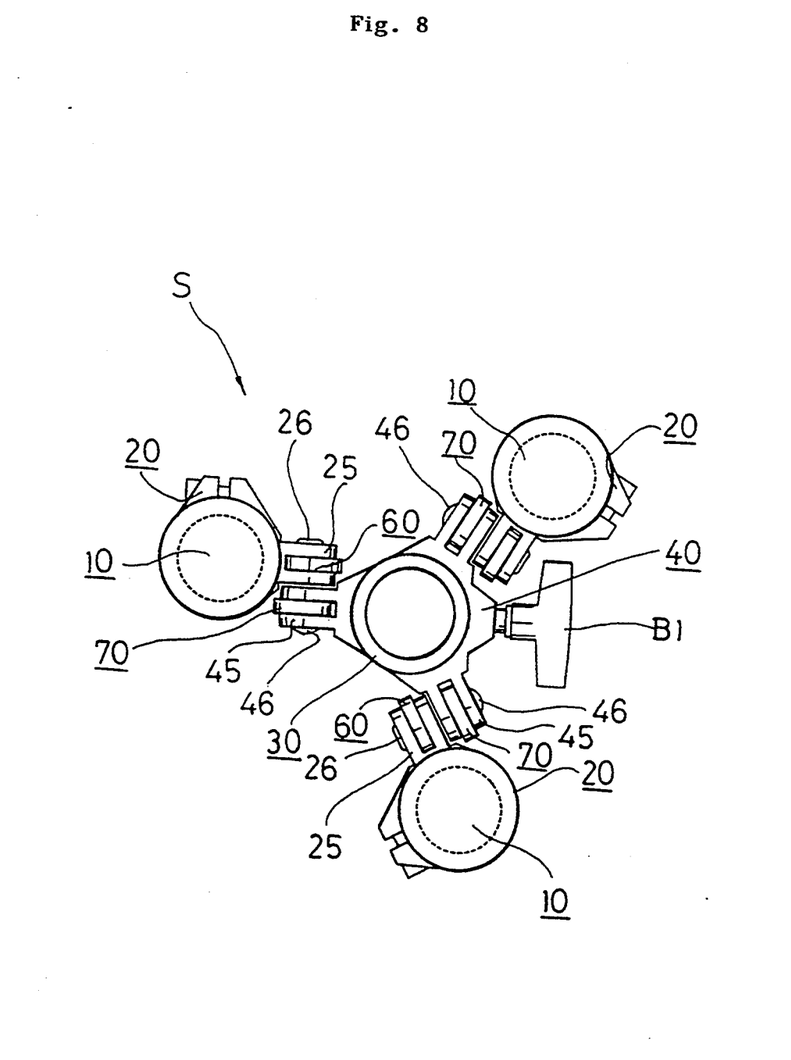
FIG. 8 is a plan view of the conga stand shown in FIG. 7.

On the other hand, when the conga stand S is transported or is not used, as shown in FIGS. 7 and 8, the bolts B1 and B2 are loosened and the shank upper and lower slide members 40 and 50 are slid upward along the shank 30.

Subsequently, the legs 10 are pushed toward the shank 30. The holding stays 60, the support stays 70 and the auxiliary stays 80 are then bent via the hinges 15, 25, 35, 45 and 55. Consequently, the conga stand S is folded compact, such that the legs 10, the shank 30 and the holding, support and auxiliary stays 60, 70 and 80 are longitudinally aligned.

When the conga stand S is folded, the leg slide members 20 are fixed to the legs 10 at the same height as that when the conga stand S is set up. One end of each holding stay 60 is thus kept at the same height as that when the conga stand S is set up. Therefore, when the legs 10 are again extended, the conga stand S can be set up just by sliding the shank upper slide member 40 and tightening the bolt B1 so as to level the holding stays 60, because the end of each holding stay 60 is already determined. Consequently, the embodiment obviates the need for adjustment of the holding height of the conga 100 carried out every time the related-art conga stand is set up as shown in FIG. 9.

As explained in the above, once the holding height of the conga is determined, the conga stand of the embodiment can be easily folded and set up without further adjusting the holding height. The folded conga stand is desirably compact.

The conga stand of the embodiment is convenient for transport and can be quickly set up for use without adjusting the holding height of the conga.

Furthermore, only one conga stand according to the invention can be applied to congas having various diameters.

This invention has been described above with reference to preferred embodiments as shown in the drawings. Modifications and alterations may become apparent to the one skilled in the art upon reading and understanding the specification. Despite the use of the embodiments for illustration purposes, it is intended to include all such modifications and alterations within the scope and the spirit of the appended claims.

What is claimed is:

1. A conga stand (S) comprising:

three leg members (10) positioned at each vertex of an almost equilateral triangle viewed in plane, each leg member (10) having on its upper end a presser portion (12) to be pressed against a conga drum (102) and on its lower end a leg lower hinge portion (15);

three leg slide members (20) attached along the respective leg members (10), each leg slide member (20) being provided with a hinge portion (25) and being lockable by a locking means (N);

a shank member (30) positioned at almost the center among the three leg members (10) and having a lower hinge portion (35) on a lower end thereof;

a shank upper slide member (40) attached along the shank member (30), provided with three hinge portions (45) corresponding to the respective hinge portions (25) of the leg slide members (20), and lockable by a locking means (B1);

a shank lower slide member (50) attached along the shank member (30), provided with three hinge portions (55) corresponding to the respective leg lower hinge portions (15), and lockable by a locking means (B2);

three holding stays (60), both ends of each holding stay (60) being pivotably attached to the hinge portion (25) of the leg slide member (20) and to the hinge portion (45) of the shank upper slide member (40), respectively;

three support stays (70), both ends of each support stay (70) being pivotably attached to the leg lower hinge portion (15) and to the hinge portion (55) of the shank lower slide member (50), respectively; and three auxiliary stays (80), both ends of each auxiliary stay (80) being pivotably attached to the middle portion of the support stay (70) and the lower hinge portion (35) of the shank member (30), respectively.

* * * * *